United States Patent
Gurbuz

(10) Patent No.: US 9,584,716 B2
(45) Date of Patent: Feb. 28, 2017

(54) METHOD AND APPARATUS FOR AUTOFOCUS AREA SELECTION BY DETECTION OF MOVING OBJECTS

(71) Applicant: SONY CORPORATION, Tokyo (JP)

(72) Inventor: Sabri Gurbuz, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/789,694

(22) Filed: Jul. 1, 2015

(65) Prior Publication Data
US 2017/0006211 A1    Jan. 5, 2017

(51) Int. Cl.
*H04N 5/232* (2006.01)
*H04N 5/222* (2006.01)
*G06T 7/20* (2006.01)
*G06K 9/00* (2006.01)

(52) U.S. Cl.
CPC ..... *H04N 5/23212* (2013.01); *G06K 9/00268* (2013.01); *G06K 9/00348* (2013.01); *G06T 7/2006* (2013.01); *H04N 5/2226* (2013.01); *H04N 5/23219* (2013.01); *H04N 5/23254* (2013.01); *H04N 5/23258* (2013.01); *H04N 5/23296* (2013.01); *G06T 2207/10016* (2013.01)

(58) Field of Classification Search
CPC ............ H04N 5/2226; H04N 5/23212; H04N 5/23296; H04N 5/23254; H04N 5/23258; H04N 5/23219; G06T 7/2006; G06T 2207/10016; G06K 9/00268; G06K 9/00348
USPC ....................................................... 348/352
See application file for complete search history.

(56) References Cited

U.S. PATENT DOCUMENTS

| | | | | |
|---|---|---|---|---|
| 6,768,867 | B2 * | 7/2004 | Kindaichi | G02B 7/38 348/349 |
| 8,089,515 | B2 | 1/2012 | Chebil et al. | |
| 2007/0147814 | A1 | 6/2007 | Nomura et al. | |
| 2007/0183663 | A1 | 8/2007 | Wang et al. | |
| 2012/0019728 | A1 * | 1/2012 | Moore | H04N 5/144 348/678 |
| 2012/0249826 | A1 * | 10/2012 | Kobayashi | G06K 9/036 348/222.1 |
| 2015/0043786 | A1 * | 2/2015 | Ohki | H04N 5/23254 382/107 |
| 2015/0310297 | A1 * | 10/2015 | Li | G06K 9/3241 382/199 |

(Continued)

OTHER PUBLICATIONS

ISA/US United States Patent and Trademark Office, International Search Report and Written Opinion, issued Oct. 7, 2016, related PCT International Patent Application No. PCT/US2016/041203, pp. 1-14, with claims searched, pp. 15-19.

*Primary Examiner* — Albert Cutler
(74) *Attorney, Agent, or Firm* — John P. O'Banion

(57) ABSTRACT

An improved mechanism for image area selection upon which autofocusing is directed during image capture on a digital image capture device, such as a camera or cellular phone. This image area selection provides accurate selection of moving object even when the objects being focused upon are subject to intense or unpredictable motion. The image area selection is performed based on alignment of consecutive frames (images) for which a rough foreground mask, and moving object mask have been determined. Differences between these frames are utilized to determine a moving object contour, which also provides feedback through a delay to the moving object detection step.

20 Claims, 11 Drawing Sheets

(56) References Cited

U.S. PATENT DOCUMENTS

2016/0037087 A1* 2/2016 Price .................... H04N 5/2226
348/586

* cited by examiner

METHOD AND APPARATUS FOR AUTOFOCUS AREA SELECTION BY DETECTION OF MOVING OBJECTS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technical disclosure pertains generally to camera autofocus systems, and more particularly to an area selection mechanism to facilitate autofocusing on moving objects within the camera field of view.

2. Background Discussion

An autofocus (AF) mechanism in a camera device adjusts the lens of the camera to proper focus at a given depth on the subject being captured by the camera. For instance, pressing the shutter release with a first level of pressure engages the autofocus mechanism, with a higher second level of pressure activating image capture.

In a typical scene, however, the different elements of the scene are at different depths from the camera, and thus optimum focus depends on what depth the subject is at within the field of view. Cameras often provide one or more mechanisms for single-shot autofocus. For example an AF area selection may comprise a specific area of the image upon which to optimize focus, for example a focus box fixedly retained in the center of the field of view. For dynamic scenes having one or more moving objects, various continuous AF mechanisms have been developed which attempt to lock onto a subject and remain focused on them, for instance locking on a specific area of a known object, for example the face of a human object. It is understood that a number of known object types exist for which parameters, techniques and/or classification methods are available to allow estimating spatial extent of the known object and specific areas of this known object.

However, these AF mechanisms provide less than desirable results when capturing images (video) of intensive and/or unpredictably moving subjects.

Accordingly, an improved mechanism is needed for performing area selection in the driving of the autofocus process within a still or video camera. The present disclosure fulfills that need while overcoming many shortcomings of prior approaches.

BRIEF SUMMARY

An apparatus and method are described for automatic autofocus (AF) area selection. In general, an AF system selects a focus automatically or manually. Under intense motion conditions, such as during action sports, a photographer may be unable to focus on a rapidly moving AF target because the motion of the target is intensive and/or unpredictable. Hence, it is beneficial to automatically recognize the correct AF area from the images. A technique is described for making an AF area selection in response to the detection of moving objects by utilizing consecutive aligned two frame image difference information. Then, the apparatus follows encoded AF area selection rules in selecting the most likely areas among moving objects to be chosen as an AF area. In the case that there are no moving objects, then a most salient area is selected where the face (if present) has the highest priority. Once an AF area is selected, the depth of field is calculated by either active (such as depth sensing using IR), passive (such as image contrast) or hybrid methods, so that the lens focus is properly adjusted to the selected AF area.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION

Figure 1:
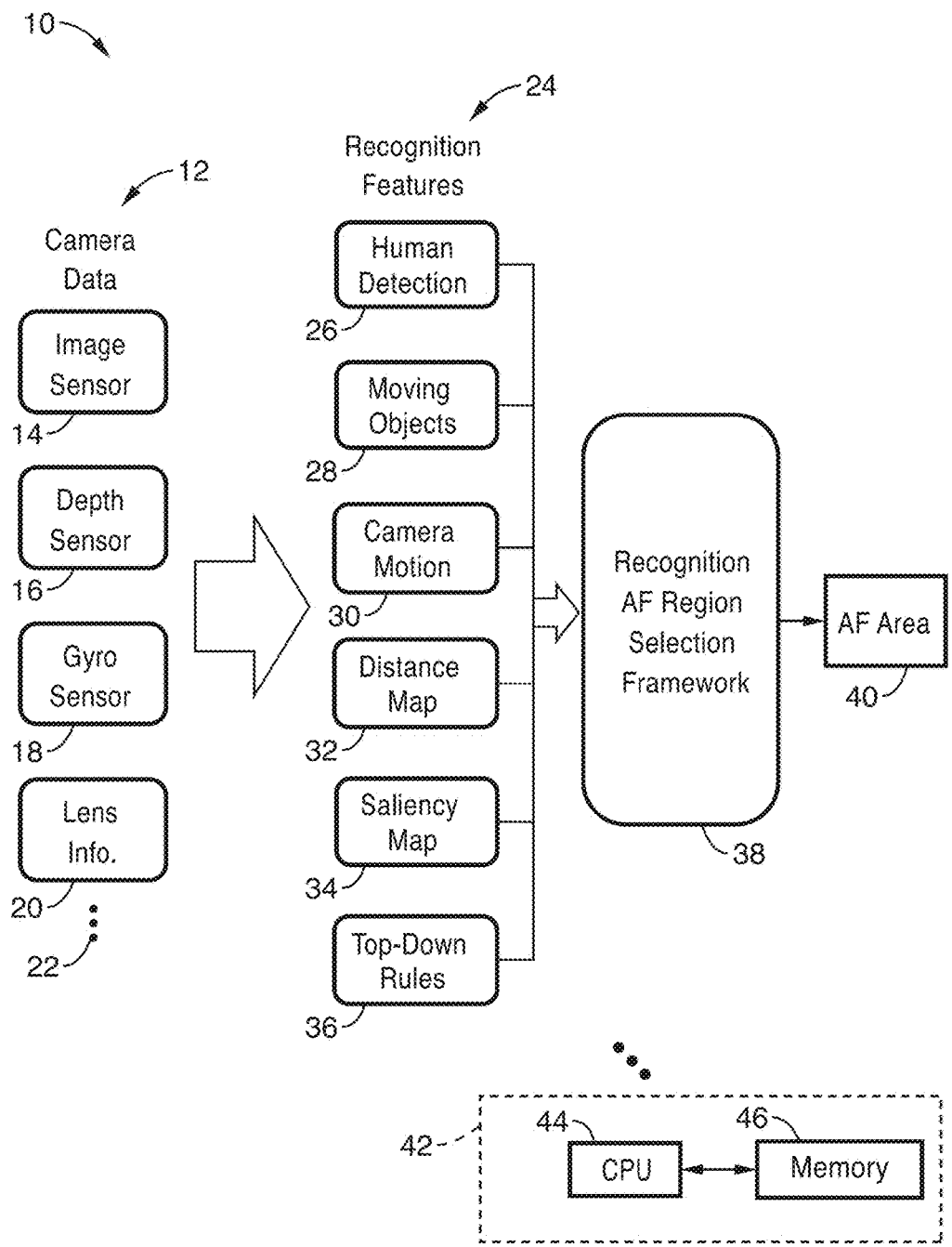
FIG. 1 is a block diagram of an apparatus configured for performing autofocus area selection using moving object detection (MOD) according to an embodiment of the present disclosure.

FIG. 1 illustrates an example embodiment 10 of a digital image capture apparatus (still images and/or video frames) having improved area selection. It should be appreciated that although the digital image capture apparatus may comprise various devices, such as cameras, cellular phones, surveillance equipment and so forth, these will be generically referred to herein as a 'camera' for the sake of simplicity. In addition, the images captured by the camera may be interchangeably referred to herein as either images, or frames.

The camera generates data 12 comprising image sensor data (e.g., captured images/frames) 14, depth sensor information 16, optional gyroscopic information 18, and information on lens positioning 20, while other optional data 22 may be collected. This data 12 is processed in the camera with a set of recognition features 24 comprising human detection 26, moving object detection 28, camera motion detection 30, distance map generation 32, saliency map generation 34, and a set of AF rules 36, such as a top down list.

A recognition AF region selection framework 38 operates with the recognition features 24 upon the camera data 12 to properly select an AF area 40. It should be appreciated that modern digital cameras are preferably implemented to include programmable processing 42, such as including one or more computer processor devices (e.g., CPU, microprocessor, microcontroller, computer enabled ASIC, etc.) 44 and associated memory 46 for storing data and instructions (e.g., RAM, DRAM, NVRAM, FLASH, computer readable media, etc.). Programming (instructions) stored in the memory are executed on the processor to perform the steps of the various method elements described herein. The presented technology is non-limiting with regard to memory and computer-readable media, insofar as these are non-transitory, and thus not constituting a transitory electronic signal.

Figure 2A:
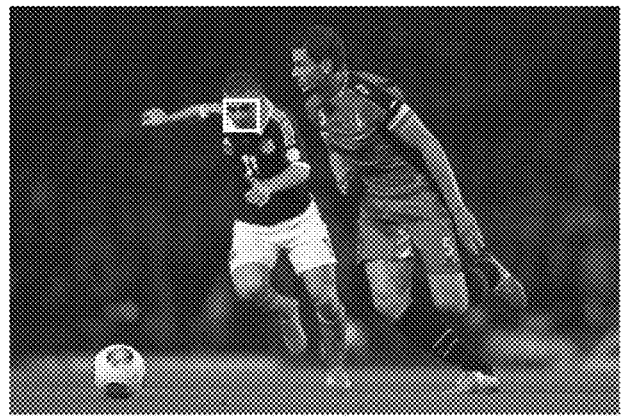
FIG. 2A through FIG. 2C are images depicting stages during autofocus area selection using moving object detection (MOD) according to an embodiment of the present disclosure.
Figure 2B:
Figure 2C:
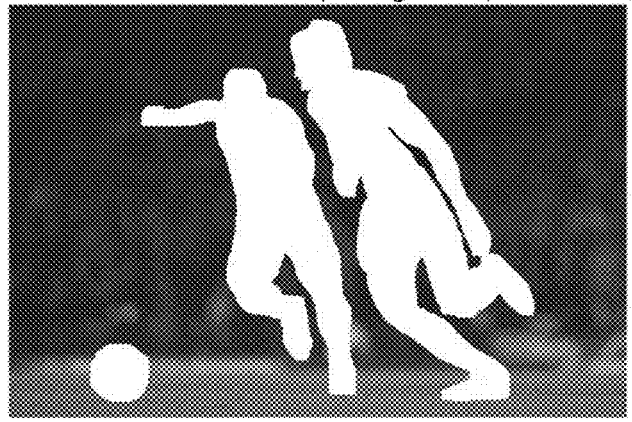

FIG. 2A through FIG. 2C illustrate an example of segregating moving objects from the background so as to prevent the camera from focusing on the background, instead of the moving foreground. In FIG. 2A the entire scene is shown with two moving players and a soccer ball, against the distant background of a crowd. In FIG. 2B the moving objects (players and soccer ball) are seen segregated from the background, while FIG. 2C depicts the background (static scene) from which the foreground moving objects have been removed.

Typically with human subjects it is more important to provide proper focus on the facial features, rather than extremities, whereby within the moving objects an AF area of the face is shown selected in FIG. 2A. It should be appreciated, however, that the present technology does not limit where the focus is placed within the moving object, but provides a mask of the moving objects within which the particular focus can be selected using one more desired mechanisms, many of which are known.

Figure 3:
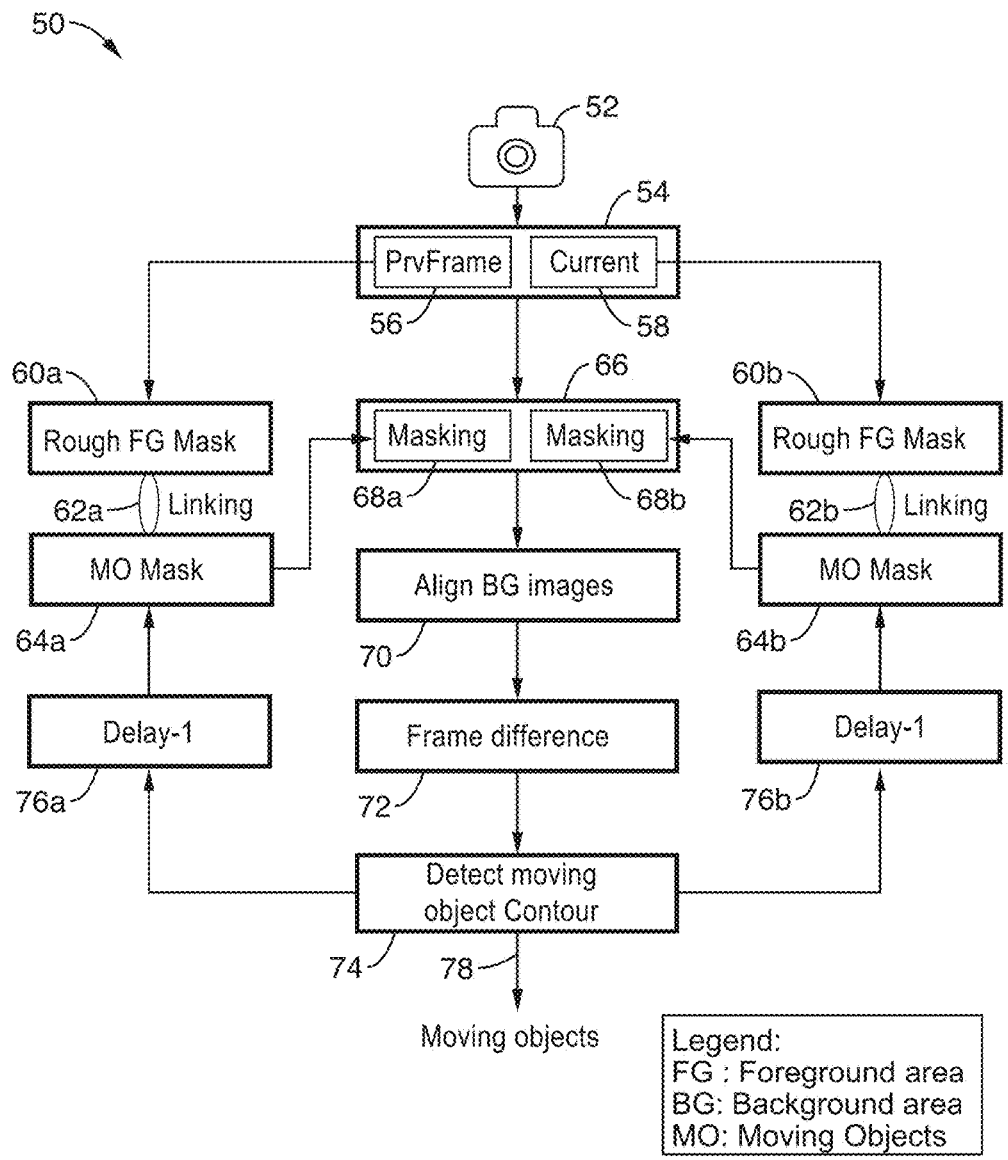
FIG. 3 is a flow diagram of performing autofocus area selection using moving object detection (MOD) according to an embodiment of the present disclosure.

FIG. 3 illustrates an example embodiment 50 of the presented moving object detection apparatus, system, and/or method. Although the present disclosure covers both apparatus, system and method, the steps in the process will be generally described as method steps, while it is understood that these are applicable to an apparatus and system incorporating these method step sequences. Camera 52 is seen generating a current frame 54, while a previous frame 56 is available. For each of these images a rough foreground (FG) mask is determined 60a, 60b, and a linking 62a, 62b performed and a moving object masks generated 64a, 64b. The linking step combines the rough foreground mask with the moving object mask from the previous time instance by union of the masks. The moving object masks 64a, 64b are input into a masking step 66, in which masking is performed separately for the previous frame 68a, and for the current frame 68b. Then a step is performed 70 for aligning the associated background image of these images, after which a frame difference is determined 72. A process is performed to detect the contour (area) of the moving object 74 and output a moving object mask 78. The moving object contour is fed back through sufficient delays 76a, 76b to arrive at the proper frame sequence 'phase' as feedback into the moving object masking steps 64a, 64b, to close the loop to enhance the moving object detection.

Figure 4A:
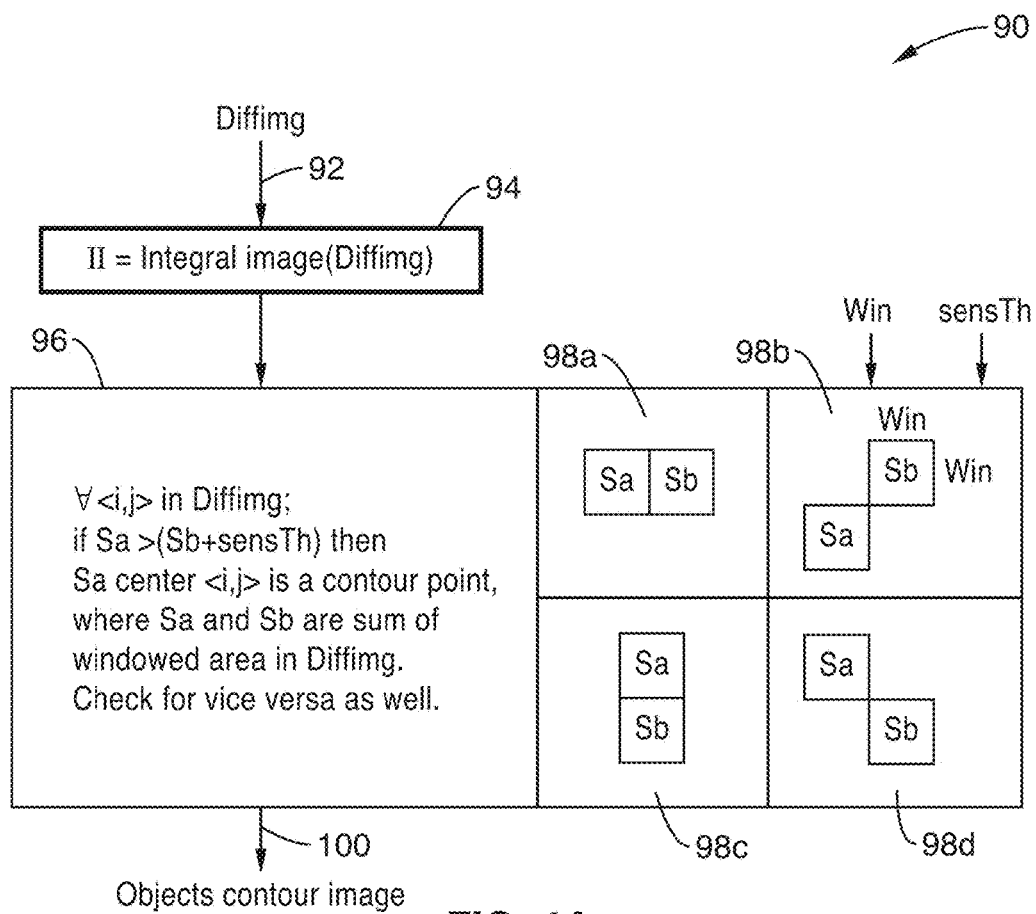
FIG. 4A and FIG. 4B are flow diagrams for performing a moving object contour process, such as utilized in autofocus area selection according to an embodiment of the present disclosure.
Figure 4B:
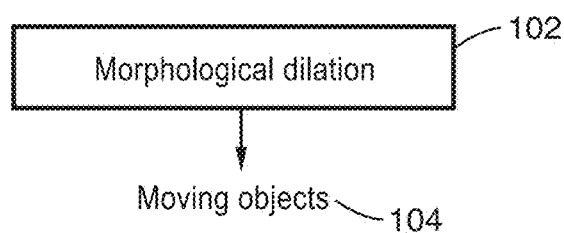

FIG. 4A and FIG. 4B illustrate an embodiment 90 for performing moving object contour (area) detection. In FIG. 4A is illustrated an object contour detection process 90 using a difference image. Parameter diffimg 92 is received at block 94 for I1=Integral image(Diffimg). The diff_b_contour (diffimg, Win, sensTh . . . ) method accepts three parameters: diffimg, the Win sub-window value (typically 7×7) and sensTh as sensitivity threshold value. Block 96 in the figure executes multiple (e.g., three) separate filters to detect moving object borders on the difference image: 98a is a horizontal filter, 98b is a 45 degree filter, 98c is a 90 degree filter, and 98d is a 135 degree filter. Sa and Sb represent a sum of the intensity values inside each sub-window, respectively. If Sa>(Sb+sensTh), then Sa sub-window area is considered to be on a moving object contour and set to be true in that case, where sensTh is typically assigned to value of 16 per pixel (sensTh=Win×16) at the first iteration and 8 per pixel at the second iteration. Furthermore, the inventive method checks for the condition Sb>(Sa+sensTh). If that condition is true then the Sb sub-window area is set to be the moving object border. As a result, the objects contour image 100 is output as moving object borders.

Referring to FIG. 4A, it will be appreciated that this represents a dynamic thresholding process. In considering Sb>(Sa+sensTh) (sensitivity_threshold), it will be recognized that there is no hard-coded threshold; instead the threshold is preferably a relative threshold operation. In the present embodiment, the dynamic threshold is achieved by comparing a first sum of intensity value (e.g., Sa or Sb) against a second sum of intensity values (e.g., Sb or Sa) added to a sensitivity threshold sensTh as an offset. For example consider Sb=240, Sa=210, SensTh=16 that is 240>210+16, then the Equation would be true. Similarly, considering Sb=30, Sa=10, SensTh=16, that is 30>10+16, then again the equation would be true. On the other hand, consider the case with Sb=240, Sa=230, and SensTh=16, that is 240>230+16, whereby the equation would be false.

In FIG. 4B is illustrated passing the recovered contour output to a morphological dilation process 102 to close further gaps inside the contour in outputting moving objects 104.

It will be appreciated, however, that other approaches can be similarly utilized to perform moving object contour detection, without departing from the teachings of the present disclosure.

Figure 5A:
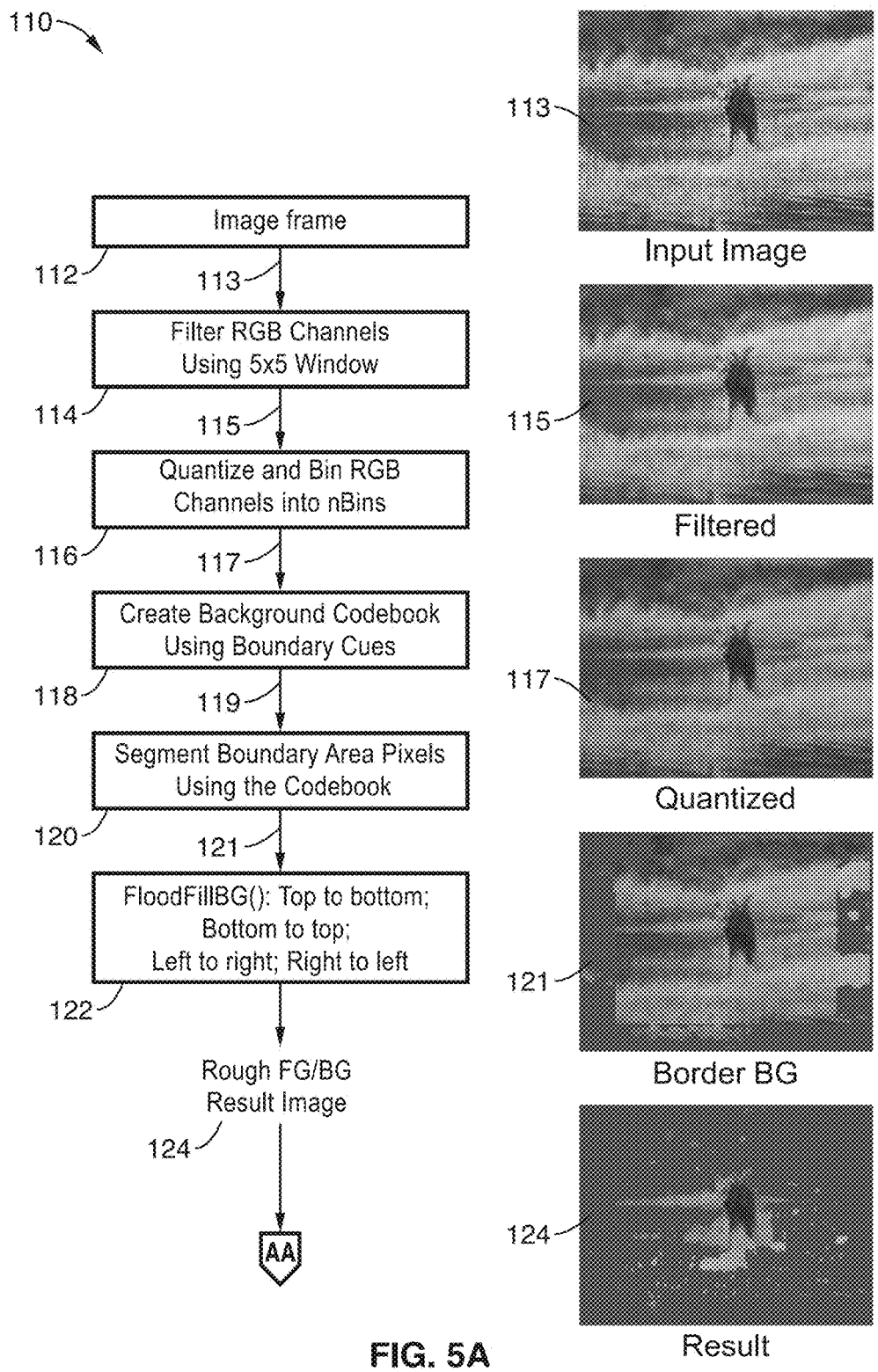
FIG. 5A and FIG. 5B are a flow diagram of rough foreground area detection as may be utilized in performing autofocus area selection according to an embodiment of the present disclosure.
Figure 5B:
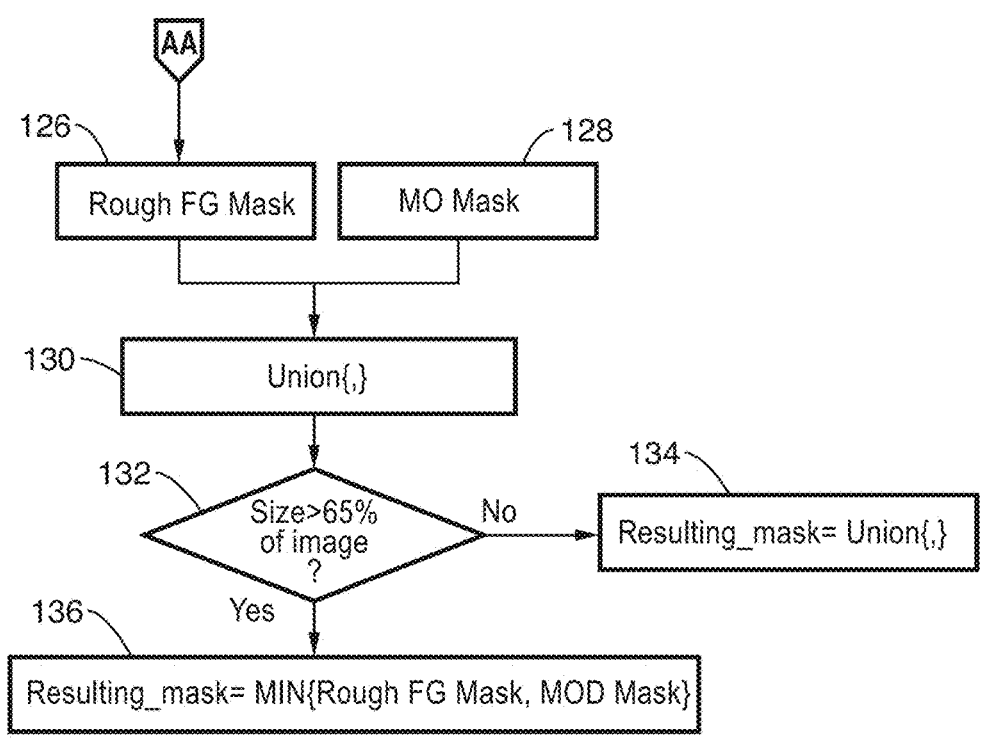

FIG. 5 illustrates an example embodiment 110 of a rough foreground area detection process. An input image 112 is received (example image 113) from which color channels (e.g., RGB or other desired color system) are filtered 114 within a selected window, such as exemplified as a 5×5 pixel window, to arrive at filtered image 115. The filtered image 115 is then quantized and the color channels are binned into n bins 116 to arrive at image 117. A background codebook is then generated 118 which is output 119 followed by segmenting boundary area pixels using the codebook 120 to result in generating border BG image 121. It will be appreciated that after a binning operation, R pixel value is mapped to r, G value is mapped to g, and B value is mapped to b. Then, using r, g, b values, a single number called hash index is generated to represent these r, g, b values. Hash index=r*numOfBins*numOfBins+g*numOfBins+b. Hence, it is beneficial to identify what is the common hash index around the frame boundaries. Therefore, the method builds a histogram of hash indexes just for frame boundary areas. The histogram index that holds more than a desired amount (e.g., 20%) of the total distribution will be selected for the background code book.

A flood fill of the background is then performed 122, such as in the order of from top to bottom, from bottom to top; from left to right; and from right to left. The flood fill algorithm labels the contiguous background pixels as background starting from a boundary pixel for each direction using the codebook. As a result of these steps a rough foreground/background is produced 124.

A rough foreground mask is extracted 126 and utilized in combination with a motion object mask 128 to a union step 130. In general, the union operation turns a pixel location in an image ON if either foreground mask or moving object mask is ON for that pixel location. It should however be appreciated that other forms of combination can be utilized for specific applications without departing from the teachings herein. Output from the union is received at a size decision block 132, which in this example has a size threshold of 65% of the image. If the size of the foreground is not greater than the threshold (e.g., 65% of the total frame size), then the resulting mask is set equal 134 to the output of the union, otherwise the resulting mask is set equal 136 to the minimum of the rough foreground mask and the motion object mask, that is to say selecting the smallest mask.

Figure 6A:
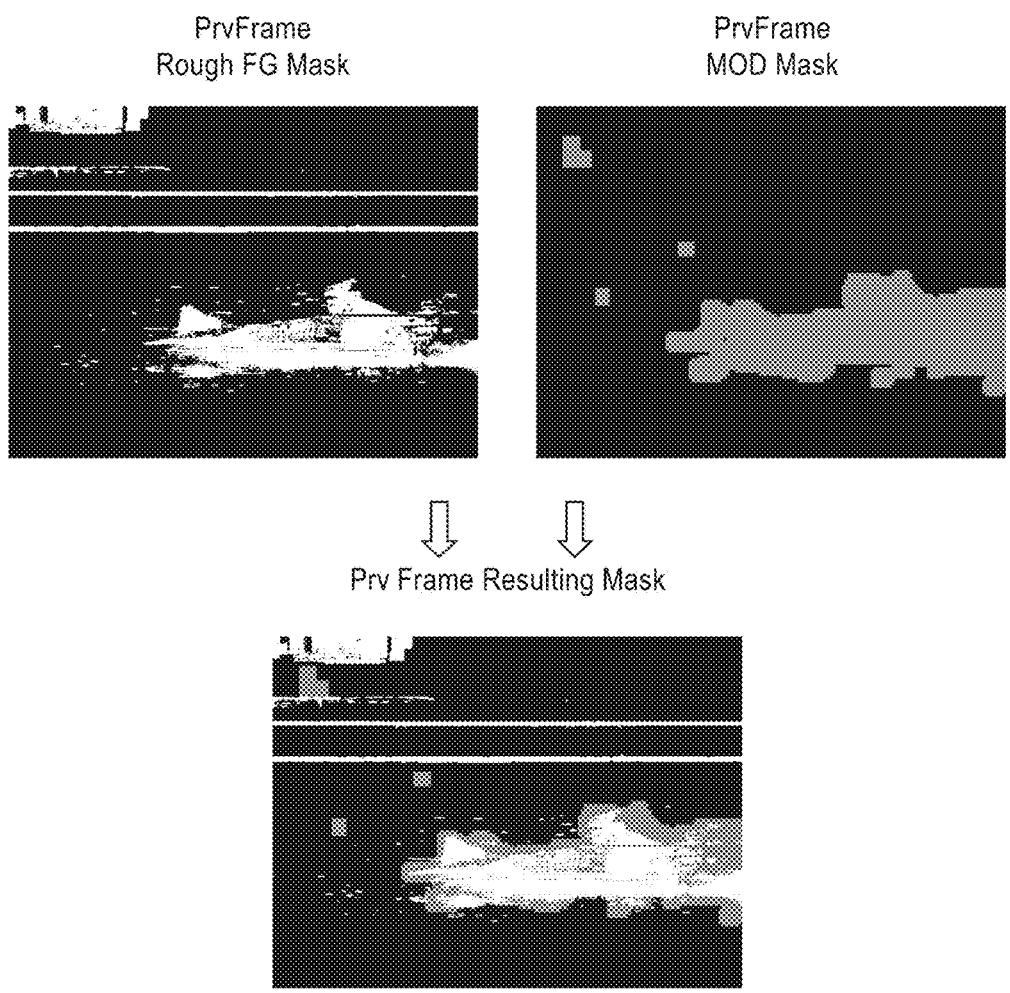
FIG. 6A and FIG. 6B are image union operations for combining rough foreground masks and moving object detection (MOD) masks for the previous and current frames according to an embodiment of the present disclosure.
Figure 6B:
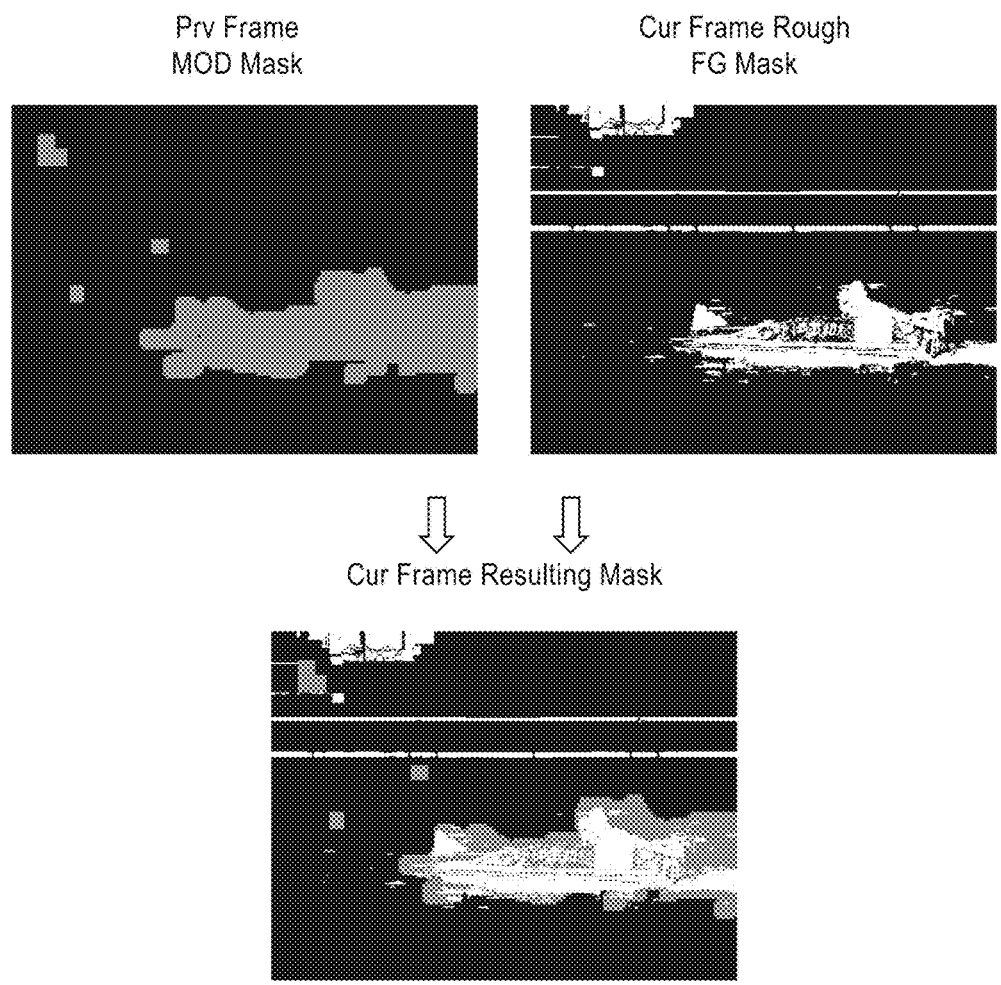

FIG. 6A and FIG. 6B illustrates an example of the masking process for the previous and current frame, respectively. In FIG. 6A a previous frame rough foreground mask is shown along with a previous frame motion mask being joined (e.g., union seen in block 130 of FIG. 5) into a previous frame resulting mask. Similarly, in FIG. 6B a current frame motion mask is shown along with a current frame rough foreground mask being joined (e.g., union seen in block 130 of FIG. 5) into a current frame resulting mask.

Figure 7A:
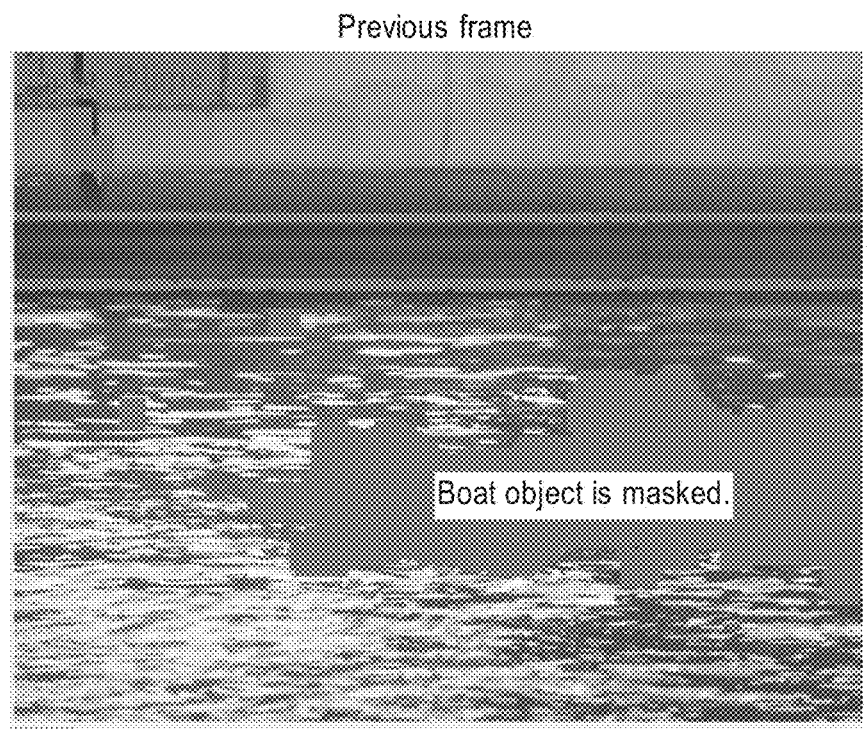
FIG. 7A and FIG. 7B are images showing rough masking of moving foreground objects as utilized during autofocus area selection according to an embodiment of the present disclosure.
Figure 7B:
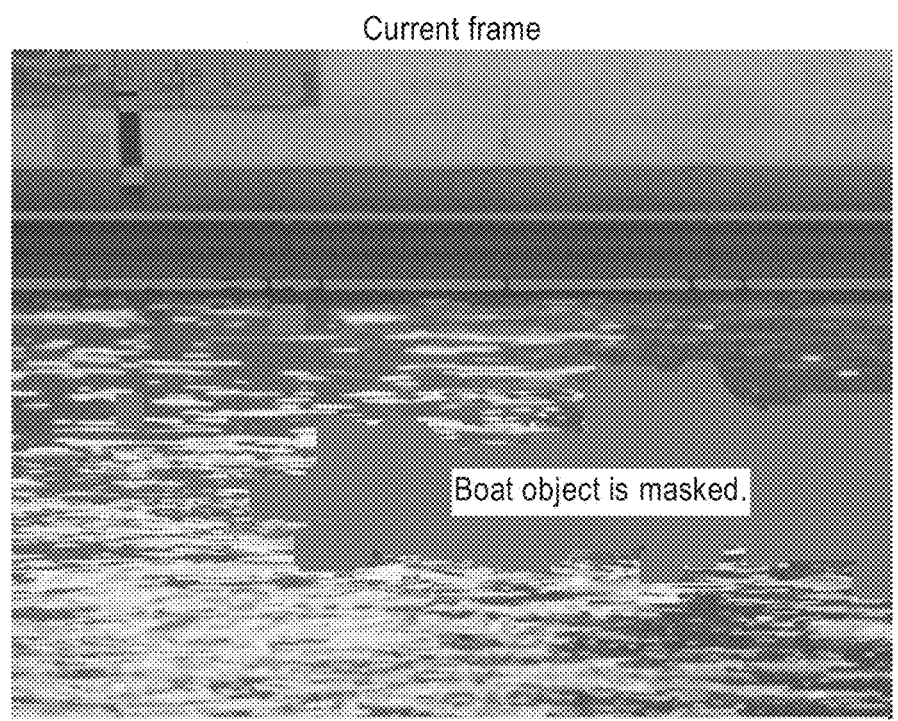

FIG. 7A and FIG. 7B depict previous and current frames, respectively, showing remaining pixels after the rough foreground masking process is performed. It will be seen that the gray areas marked as "boat object is masked" are masked from the global motion vectors (GMV) calculation process.

From this it is seen that global motion vector (GMV) can be estimated for the common background while the masked areas are eliminated from the GMV calculation process.

Figure 8:
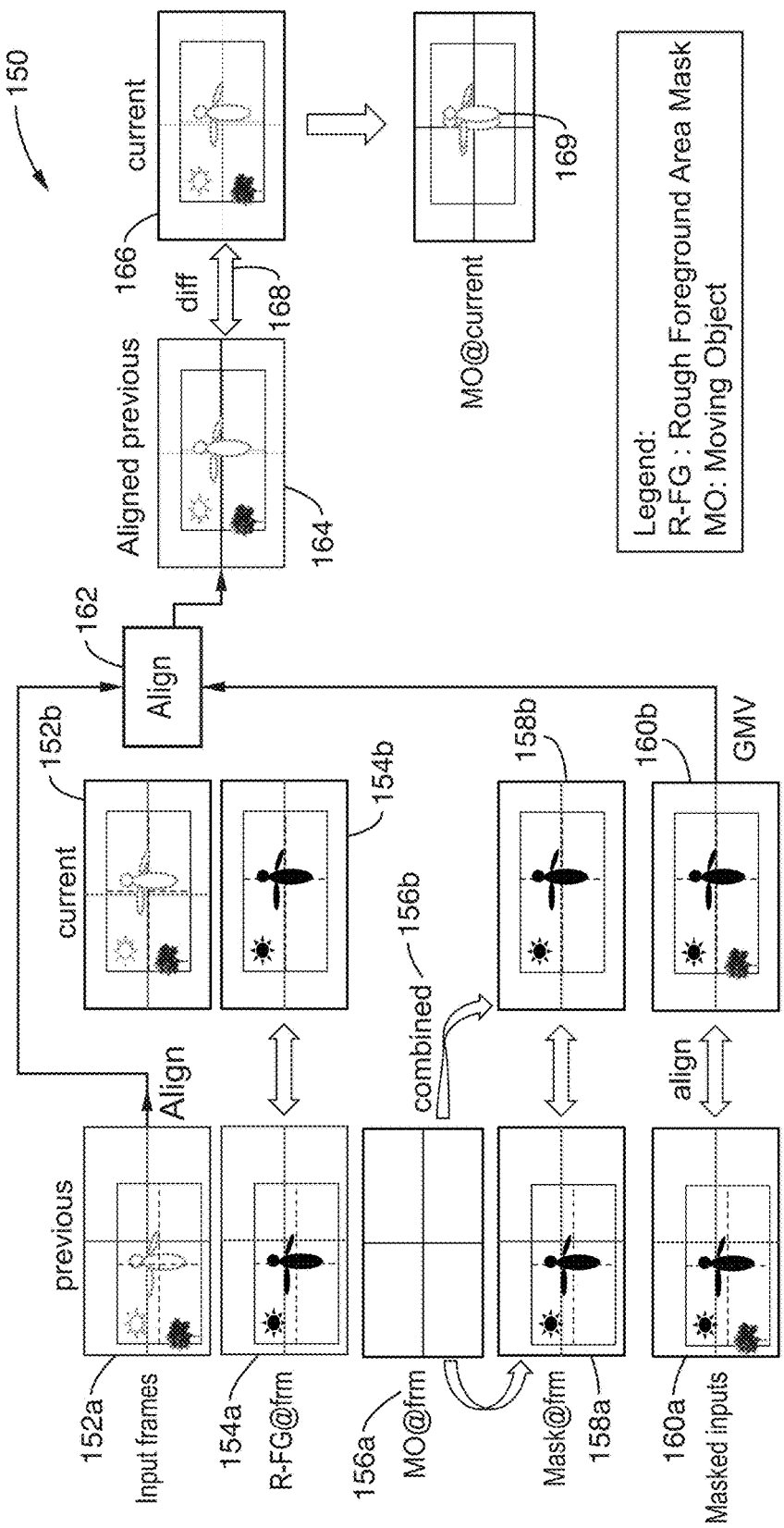
FIG. 8 is a flow diagram of two frame motion object detection for performing autofocus area selection according to an embodiment of the present disclosure.

FIG. 8 illustrates an example embodiment 150 of a two frame difference based moving object selection method. Basically FIG. 8 illustrates with pictures how moving object areas are detected. 152a and 152b are previous and current image frames. 154a and 154b are rough foreground masks obtained from 152a and 152b, respectively. Since we have no moving object mask 156a at initial frame pair, Union operation 130 provides a combination 156b that would result in 158a and 158b which are the same as 154a and 154b in this case. Areas 152a are masked using the mask 158a that results in 160a. Similarly, areas in 152b are masked using the mask 158b that results in 160b. The global motion vector (GMV) is calculated that aligns 162 the image 160a to 160b. Now, using the GMV 152a is aligned to generate 164. Then, the difference 168 is generated between 164 and 166 (which is same as 152b) is determined 169.

Figure 9A:
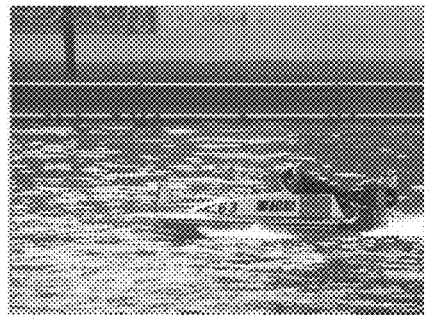
FIG. 9A through FIG. 9E are images in the process of performing autofocus area selection using moving object detection (MOD) according to an embodiment of the present disclosure.
Figure 9B:
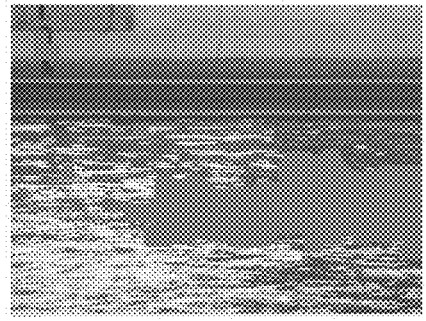
Figure 9C:
Figure 9D:
Figure 9E:
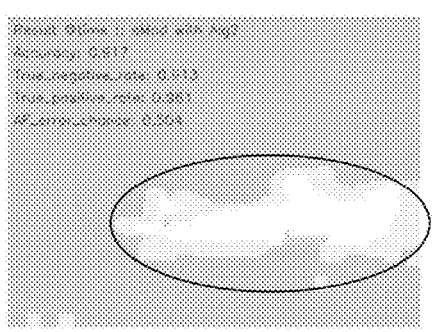

FIG. 9A through FIG. 9E illustrates moving object detection results of a boat which is likely an autofocusing target. A current frame is seen in FIG. 9A, with masked previous frame in FIG. 9B, masked current frame in FIG. 9C, rough foreground mask in FIG. 9D, and final object detection results in FIG. 9E. FIG. 9D shows the current rough foreground mask. The previous frame's rough foreground mask is not shown here. FIGS. 9B and 9C show masked previous and masked current frames using the previous moving object masks and their rough foreground masks. FIG. 9E shows the final moving object result for an AF application.

The present disclosure thus provides for selection of an autofocus area as input for driving lens autofocusing actions. The method can be implemented in various digital image capture devices, such as cameras, cellular phones, and so forth that are configured for capturing still or video imaging.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An apparatus for performing autofocus selection for image capture, comprising: (a) a processor within an image capture device having a lens that can be focused to a selected depth; and (b) memory storing instructions executable by the processor; (c) said instructions when executed by the processor performing steps comprising: (c)(i) detecting a rough estimate of foreground image area in a previous frame and a current frame captured by the image capture device; (c)(ii) masking of said foreground image area as a foreground mask in said previous frame and a current frame for global motion determination; (c)(iii) integrating said foreground mask with a previous moving object mask; (c)(iv) aligning background images in the previous frame and the current frame; (c)(v) determining frame differences between the previous frame and the current frame; (c)(vi) generating a moving object mask in response to moving object area detection; (c)(vii) utilizing the moving object mask from the previous frame with one frame delay on the current frame; (c)(viii) segmenting foreground and background based on generated moving object mask; and (c)(ix) performing autofocusing with focusing directed to a location within said moving object mask.

2. The apparatus of any preceding embodiment, wherein said instructions when executed by the processor perform object area detection in response to utilizing multiple filters to detect moving objects borders on the difference image between the current and previous frames.

3. The apparatus of any preceding embodiment, wherein said instructions when executed by the processor perform a union operation which turns a pixel location in an image to ON if either the foreground mask or the moving object mask is ON as a mechanism for integrating of said foreground mask with a previous moving object mask.

4. The apparatus of any preceding embodiment, wherein said instructions when executed by the processor perform said autofocusing in response to receiving additional information selected from the group of information consisting of camera motion detection, a distance map, and a saliency map.

5. The apparatus of any preceding embodiment, wherein said instructions when executed by the processor select said location for said focusing within said moving object mask as based on known object classification methods.

6. The apparatus of any preceding embodiment, wherein said instructions when executed by the processor select said location for said focusing as facial features within said moving object mask when the known object classification method utilized is human object classification.

7. The apparatus of any preceding embodiment, wherein said instructions when executed by the processor select said location for said focusing which follows a set of autofocusing rules.

8. The apparatus of any preceding embodiment, wherein said instructions when executed by the processor create a background codebook utilizing boundary cues, and utilizing said codebook in segmenting boundary area pixels.

9. The apparatus of any preceding embodiment, wherein said apparatus comprises a still and/or video imaging device.

10. The apparatus of any preceding embodiment, wherein said apparatus is selected from a group of digital image capture devices, consisting of cameras, cellular phones, and surveillance devices.

11. An apparatus for performing autofocus selection based on image input, comprising: (a) a processor within a still and/or video image capture device having a lens that can be focused to a selected depth; and (b) memory storing instructions executable by the processor; (c) said instructions when executed by the processor performing steps comprising: (c)(i) detecting a rough estimate of the foreground image area in a previous frame and a current frame captured by an image capture device; (c)(ii) masking of said foreground image area as a foreground mask in said previous frame and a current frame for global motion determination; (c)(iii) integrating said foreground mask with a previous moving object mask; (c)(iv) aligning background images in the previous frame and the current frame; (c)(v) determining frame differences between the previous frame and the current frame as a difference image; (c)(vi) generating a moving object mask in response to moving object area detection utilizing multiple filters to detect moving objects borders on the difference image; (c)(vii) utilizing the moving object mask from the previous frame with one frame delay on the current frame; (c)(viii) segmenting foreground and background based on generated moving object mask; and (c)(ix) performing autofocusing with focusing directed to a location within said moving object mask.

12. A method of performing autofocus area selection for moving objects, comprising: (a) detecting a rough estimate of the foreground image area in a previous frame and a current frame captured by an image capture device; (b) masking of said foreground image area as a foreground mask in said previous frame and a current frame for global motion determination; (c) integrating said foreground mask with a previous moving object mask; (d) aligning background images in the previous frame and the current frame; (e) determining frame differences between the previous frame and the current frame as a difference image; (f) generating a moving object mask in response to moving object area detection; (g) utilizing the moving object mask from the previous frame with one frame delay on the current frame; (h) segmenting foreground and background based on generated moving object mask; and (i) performing autofocusing with focusing directed to a location within said moving object mask.

13. The method of any preceding embodiment, wherein said moving object area detection utilizes multiple filters to detect moving objects borders on the difference image.

14. The method of any preceding embodiment, wherein said integrating of said foreground mask with a previous moving object mask is performed in response to a union operation which operates to turn a pixel location in an image to ON if either the foreground mask or the moving object mask is ON.

15. The method of any preceding embodiment, wherein said autofocusing is performed by adjusting a lens of an image capture device for proper focus.

16. The method of any preceding embodiment, further comprising said autofocusing being performed in response to receiving additional information selected from the group of information consisting of camera motion detection, a distance map, and a saliency map.

17. The method of any preceding embodiment, further comprising selecting said location for said focusing within said moving object mask as based on known object classification methods.

18. The method of any preceding embodiment, further comprising selecting said location for said focusing which follows a set of autofocusing rules.

19. The method of any preceding embodiment, further comprising creating a background codebook utilizing boundary cues, and utilizing said codebook in segmenting boundary area pixels.

20. The method of any preceding embodiment, wherein said method is configured for execution during still or video imaging by an electronic device selected from a group of digital image capture devices, consisting of cameras, cellular phones, and surveillance devices.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for performing autofocus selection for image capture, comprising:
    (a) a processor within an image capture device having a lens that can be focused to a selected depth in an autofocusing process; and
    (b) memory storing instructions executable by the processor;
    (c) said instructions when executed by the processor performing steps of said autofocusing process comprising:
        (i) detecting a rough estimate of foreground image area in a previous frame and a current frame captured by the image capture device;
        (ii) masking of said foreground image area as a foreground mask in both said previous frame and a current frame for global motion determination;
        (iii) combining said foreground mask for each of said previous frame and said current frame with a previous moving object mask in a linking step which performs a union of the masks;
        (iv) masking is performed separately, using the union of the masks, for the previous frame and the current frame;
        (v) aligning background images in the previous frame and the current frame;
        (vi) determining frame differences between the previous frame and the current frame;
        (vii) generating a moving object mask in response to moving object area detection;
        (viii) utilizing the moving object mask with frame delay on both the current frame and the previous frame;
        (ix) segmenting foreground and background based on generated moving object mask; and
        (x) performing autofocusing with focusing directed to a location within said moving object mask.

2. The apparatus as recited in claim 1, wherein said instructions when executed by the processor perform object area detection in response to utilizing multiple filters to detect moving objects borders on a difference image between the current and previous frames.

3. The apparatus as recited in claim 1, wherein said instructions when executed by the processor perform a union operation which turns a pixel location in an image to ON if either the foreground mask or the moving object mask is ON as a mechanism for integrating of said foreground mask with a previous moving object mask.

4. The apparatus as recited in claim 1, wherein said instructions when executed by the processor perform said autofocusing in response to receiving additional information selected from the group of information consisting of camera motion detection, a distance map, and a saliency map.

5. The apparatus as recited in claim 1, wherein said instructions when executed by the processor select said location for said focusing within said moving object mask as based on known object classification methods.

6. The apparatus as recited in claim 5, wherein said instructions when executed by the processor select said location for said focusing as facial features within said moving object mask when the known object classification method utilized is human object classification.

7. The apparatus as recited in claim 5, wherein said instructions when executed by the processor select said location for said focusing which follows a set of autofocusing rules.

8. The apparatus as recited in claim 1, wherein said instructions when executed by the processor create a background codebook utilizing boundary cues, and utilizing said codebook in segmenting boundary area pixels.

9. The apparatus as recited in claim 1, wherein said apparatus comprises a still and/or video imaging device.

10. The apparatus as recited in claim 1, wherein said apparatus is selected from a group of digital image capture devices, consisting of cameras, cellular phones, and surveillance devices.

11. An apparatus for performing autofocus selection based on image input, comprising:
(a) a processor within a still and/or video image capture device having a lens that can be focused to a selected depth in an autofocusinq process; and
(b) memory storing instructions executable by the processor;
(c) said instructions when executed by the processor performing steps said autofocusinq process comprising:
   (i) detecting a rough estimate of the foreground image area in a previous frame and a current frame captured by an image capture device;
   (ii) masking of said foreground image area as a foreground mask in said previous frame and a current frame for global motion determination;
   (iii) integrating said foreground mask for each of said previous frame and said current frame with a previous moving object mask;
   (iv) aligning background images in the previous frame and the current frame;
   (v) determining frame differences between the previous frame and the current frame as a difference image;
   (vi) generating a moving object mask in response to moving object area detection utilizing multiple filters to detect moving objects borders on the difference image;
   (vii) utilizing said moving object mask with frame delay on both the current frame and the previous frame;
   (viii) segmenting foreground and background based on generated moving object mask; and
   (ix) performing autofocusing with focusing directed to a location within said moving object mask.

12. A method of performing autofocus area selection for moving objects, comprising:
(a) detecting a rough estimate of the foreground image area in a previous frame and a current frame captured by an image capture device configured with a computer processor configured for performing autofocusing;
(b) masking of said foreground image area as a foreground mask in both said previous frame and a current frame for global motion determination;
(c) combining said foreground mask with a previous moving object mask in a linking step which performs a union of the masks;
(d) masking is performed separately, using the union of the masks, for the previous frame and the current frame;
(e) aligning background images in the previous frame and the current frame;
(f) determining frame differences between the previous frame and the current frame as a difference image;
(g) generating a moving object mask in response to moving object area detection;
(h) utilizing the moving object mask with frame delay on the current frame and the previous frame;
(i) segmenting foreground and background based on generated moving object mask; and
(j) performing autofocusing with focusing directed to a location within said moving object mask.

13. The method as recited in claim 12, wherein said moving object area detection utilizes multiple filters to detect moving objects borders on the difference image.

14. The method as recited in claim 12, wherein said integrating of said foreground mask with a previous moving object mask is performed in response to a union operation which operates to turn a pixel location in an image to ON if either the foreground mask or the moving object mask is ON.

15. The method as recited in claim 12, wherein said autofocusing is performed by adjusting a lens of an image capture device for proper focus.

16. The method as recited in claim 12, further comprising said autofocusing being performed in response to receiving additional information selected from the group of information consisting of camera motion detection, a distance map, and a saliency map.

17. The method as recited in claim 12, further comprising selecting said location for said focusing within said moving object mask as based on known object classification methods.

18. The method as recited in claim 17, further comprising selecting said location for said focusing which follows a set of autofocusing rules.

19. The method as recited in claim 12, further comprising creating a background codebook utilizing boundary cues, and utilizing said codebook in segmenting boundary area pixels.

20. The method as recited in claim 12, wherein said method is configured for execution during still or video imaging by an electronic device selected from a group of digital image capture devices, consisting of cameras, cellular phones, and surveillance devices.

* * * * *